United States Patent
Okamura et al.

(10) Patent No.: US 10,360,795 B2
(45) Date of Patent: Jul. 23, 2019

(54) SPEED LIMIT VIOLATION CONTROL SYSTEM AND SPEED LIMIT VIOLATION CONTROL METHOD

(71) Applicant: Panasonic Intellectual Property Management Co., Ltd., Osaka (JP)

(72) Inventors: Toshiyuki Okamura, Hyogo (JP); Hisayoshi Yamamoto, Osaka (JP); Mitsuru Kashihara, Osaka (JP); Shigenori Yatsuri, Osaka (JP); Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/946,801

(22) Filed: Apr. 6, 2018

(65) Prior Publication Data

US 2018/0225961 A1 Aug. 9, 2018

Related U.S. Application Data

(63) Continuation of application No. PCT/JP2017/031297, filed on Aug. 31, 2017.

(30) Foreign Application Priority Data

Nov. 21, 2016 (JP) ................................. 2016-225645

(51) Int. Cl.
*G08G 1/01* (2006.01)
*G08G 1/054* (2006.01)
(Continued)

(52) U.S. Cl.
CPC .............. *G08G 1/054* (2013.01); *B60R 1/00* (2013.01); *B60R 11/04* (2013.01); *G01P 3/38* (2013.01);
(Continued)

(58) Field of Classification Search
CPC .... G08G 1/054; G08G 1/0133; G08G 1/0175; G08G 1/04; B60R 1/00; B60R 11/04;
(Continued)

(56) References Cited

U.S. PATENT DOCUMENTS 6,188,329 B1 * 2/2001 Glier ....................... G07B 15/06
7,187,302 B2 * 3/2007 Dalgleish ............... G08G 1/042
340/933

(Continued)

FOREIGN PATENT DOCUMENTS

JP 2000-182185 A 6/2000
JP 2003-149256 A 5/2003
(Continued)

OTHER PUBLICATIONS

International Search Report for corresponding International App. No. PCT/JP2017/031297, dated Nov. 28, 2017.

*Primary Examiner* — Zhen Y Wu
(74) *Attorney, Agent, or Firm* — Renner, Otto, Boisselle & Sklar, LLP

(57) ABSTRACT

A speed limit violation control system of the present disclosure includes: imaging units (320, 330) which image a running vehicle; recorder (420) that records one of videos imaged by the imaging units (320, 330); and controller (360) that calculates a speed of the vehicle based on the videos of imaging units (320, 330) and determines a starting point and an ending point of the one of the videos, which is to be recorded in recorder (420), based on the calculated speed.

7 Claims, 7 Drawing Sheets

(51) Int. Cl.
*G06K 9/00* (2006.01)
*B60R 11/04* (2006.01)
*B60R 1/00* (2006.01)
*H04N 7/18* (2006.01)
*G01P 3/38* (2006.01)
*G08G 1/017* (2006.01)
*G08G 1/04* (2006.01)

(52) U.S. Cl.
CPC ..... *G06K 9/00785* (2013.01); *G06K 9/00805* (2013.01); *G06K 9/00825* (2013.01); *G08G 1/0133* (2013.01); *G08G 1/0175* (2013.01); *G08G 1/04* (2013.01); *H04N 7/18* (2013.01); *H04N 7/181* (2013.01); *B60R 2300/302* (2013.01); *B60R 2300/80* (2013.01)

(58) Field of Classification Search
CPC . B60R 2300/302; B60R 2300/80; G01P 3/38; G06K 9/00825; H04N 7/18; H04N 7/181
USPC .......................................................... 340/935
See application file for complete search history.

(56) References Cited

U.S. PATENT DOCUMENTS

| | | | | |
|---|---|---|---|---|
| 8,115,670 | B2* | 2/2012 | Klein | G01S 13/584 340/936 |
| 9,111,453 | B1* | 8/2015 | Alselimi | G06K 9/00785 |
| 2003/0081935 | A1* | 5/2003 | Kirmuss | H04N 7/18 386/327 |
| 2004/0252193 | A1* | 12/2004 | Higgins | G08G 1/0175 348/149 |
| 2008/0166023 | A1* | 7/2008 | Wang | G08G 1/054 382/107 |
| 2009/0174778 | A1* | 7/2009 | Allen | G07B 15/063 348/149 |
| 2010/0172543 | A1* | 7/2010 | Winkler | G08G 1/017 382/104 |
| 2010/0250060 | A1* | 9/2010 | Maeda | G07C 5/0858 701/33.4 |
| 2011/0130947 | A1* | 6/2011 | Basir | G08G 1/0104 701/119 |
| 2011/0234749 | A1* | 9/2011 | Alon | G07C 5/0866 348/36 |
| 2011/0267460 | A1* | 11/2011 | Wang | G08G 1/054 348/135 |
| 2012/0010804 | A1* | 1/2012 | Fliegen | G08G 1/04 701/119 |
| 2012/0113262 | A1* | 5/2012 | Hanisch | G08G 1/054 348/149 |
| 2013/0038681 | A1* | 2/2013 | Osipov | G08G 1/054 348/36 |
| 2013/0088600 | A1* | 4/2013 | Wu | G08G 1/054 348/149 |
| 2014/0232566 | A1* | 8/2014 | Mimeault | G01S 17/023 340/935 |
| 2014/0320645 | A1* | 10/2014 | Schmitz | G08G 1/054 348/142 |
| 2014/0336848 | A1* | 11/2014 | Saund | G08G 1/054 701/3 |
| 2016/0171312 | A1* | 6/2016 | Aoki | G08G 1/015 382/105 |
| 2016/0203715 | A1* | 7/2016 | Rothschild | B60K 31/185 340/936 |
| 2017/0330455 | A1* | 11/2017 | Kikuchi | G06K 9/00798 |
| 2018/0137754 | A1* | 5/2018 | Alon | G06K 9/00785 |

FOREIGN PATENT DOCUMENTS

| | | |
|---|---|---|
| JP | 2004-050967 A | 2/2004 |
| JP | 2004-356856 A | 12/2004 |

* cited by examiner

SPEED LIMIT VIOLATION CONTROL SYSTEM AND SPEED LIMIT VIOLATION CONTROL METHOD

BACKGROUND

1. Technical Field

The present disclosure relates to a speed limit violation control system and a speed limit violation control method, which use a camera.

2. Description of the Related Art

Unexamined Japanese Patent Publication No. 2003-149256 discloses a device for measuring an absolute speed of a running vehicle that runs adjacent to an own vehicle. This device includes: a own vehicle speed measurement unit; and an imaging unit that calculates a relative speed between the own vehicle and such a running vehicle by performing image processing on a plurality of images obtained by imaging the running vehicle at different points of time. In this way, the absolute speed of the running vehicle can be measured.

SUMMARY

A speed limit violation control system in a first aspect of the present disclosure includes: an imaging unit that images a running vehicle; a recorder that records a video imaged by the imaging unit; and a controller that calculates a speed of the vehicle based on the video imaged by the imaging unit, and determines a starting point and ending point of the video, which is to be recorded in the recorder, based on the calculated speed.

The speed limit violation control system in the first aspect of the present disclosure can automatically record a video of a violation vehicle. Hence, this speed limit violation control system is effective for efficient speed limit violation control.

A speed limit violation control system in a second aspect of the present disclosure includes: an imaging unit that images a video of a first vehicle and a second vehicle, which are running and are taken as subjects; an input unit that receives a first speed of the first vehicle and a second speed of the second vehicle, and position information acquired by an own vehicle; and a recorder that records a superimposed video obtained by superimposing the first speed and the second speed on the video.

The speed limit violation control system in the second aspect of the present disclosure can display videos of a plurality of the violation vehicles in an easy-to-understand manner for a user. Hence, this speed limit violation control system is effective for the efficient speed limit violation control.

A speed limit violation control method in a third aspect of the present disclosure images a running vehicle, calculates a speed of the vehicle based on an imaged video, determines a starting point and ending point of the video as a recording target based on the calculated speed, and records the video from the starting point to the ending point.

The speed limit violation control method in the third aspect of the present disclosure can automatically record the video of the violation vehicle. Hence, this speed limit violation control method is effective for the efficient speed limit violation control.

DETAILED DESCRIPTION

Hereinafter, exemplary embodiments will be described in detail with appropriate reference to the drawings. However, a description more in detail than necessary may be omitted. For example, a detailed description of well-known matters and a duplicate description of substantially identical configurations may be omitted. Such omissions are made in order to avoid unnecessary redundancy of the following description and to facilitate the understanding of those skilled in the art.

Note that the accompanying drawings and the following description are provided for those skilled in the art to fully understand the present disclosure, and are not intended to thereby limit the subject matter as described in the appended claims.

(First Exemplary Embodiment)

A first exemplary embodiment will be described below with reference to FIGS. 1 to 6. A speed limit violation control system described in the first exemplary embodiment is mounted, for example, on a police car. A conventional speed limit violation control system has calculated a speed of a running vehicle by a radar. In contrast, in this exemplary embodiment, the speed of the running vehicle is calculated based on a video imaged by an imaging unit. Hence, a relatively inexpensive speed limit violation control system can be achieved. Moreover, in this exemplary embodiment, recording of the video imaged by the imaging unit can be automatically started and ended such that the video includes a period while the running vehicle is running at a violation speed. In this way, a violation can be prevented from being overlooked, and can be recorded as appropriate.

[1-1. Configuration]

[1-1-1. General Configuration of Speed Limit Violation Control System]

Figure 1:
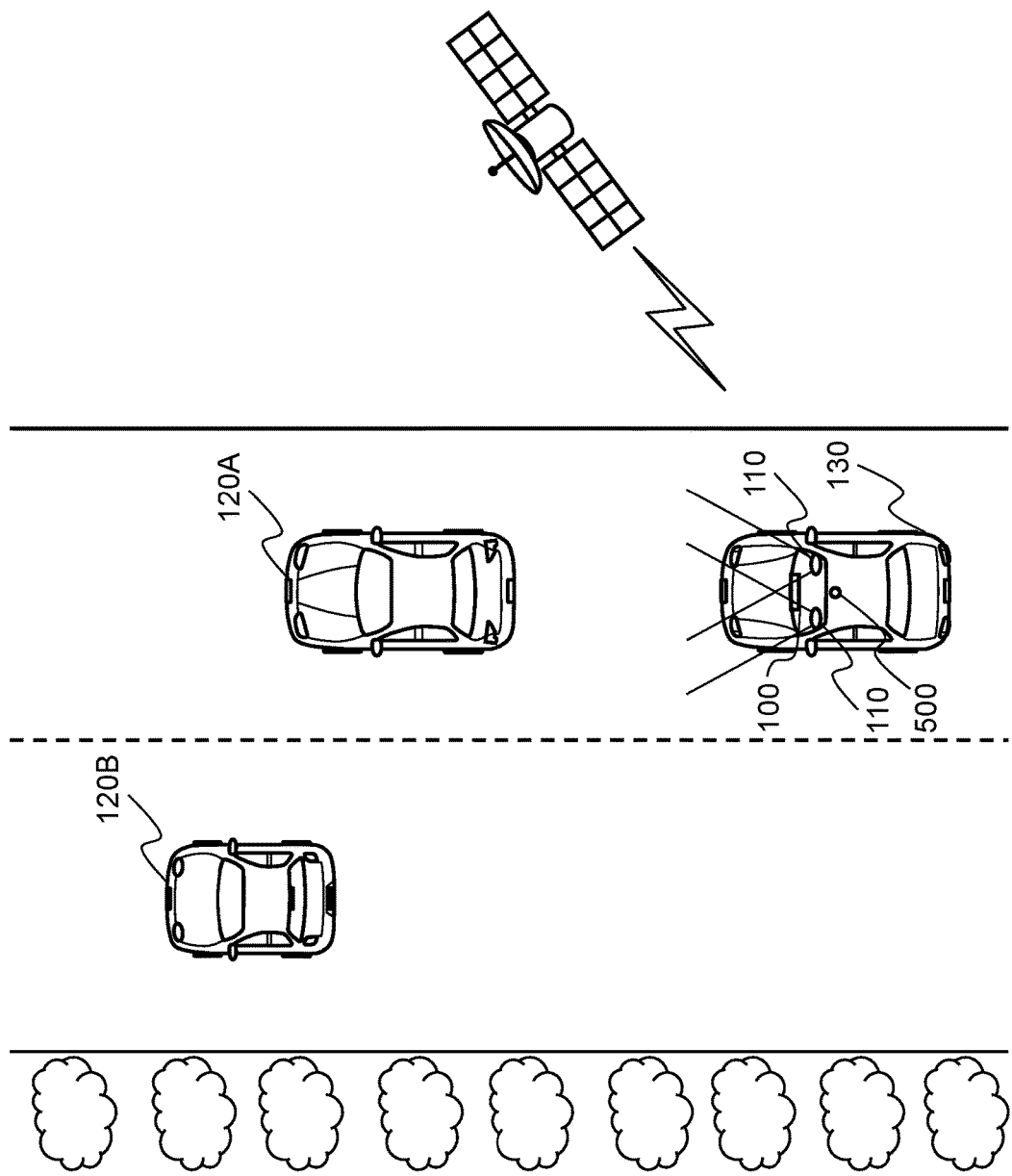
FIG. 1 is a view explaining a scene of performing speed limit violation control using a speed limit violation control system in a first exemplary embodiment.

FIG. 1 is a view explaining a scene of performing speed limit violation control using the speed limit violation control system in the first exemplary embodiment. FIG. 1 illustrates own vehicle (police car) 130, and first vehicle 120A and second vehicle 120B, which run in front of own vehicle 130. The speed limit violation control system of this exemplary embodiment includes: car location system 100; and stereo distance-measuring camera 110. Stereo distance-measuring camera 110 includes a pair of cameras.

Car location system 100 operates in conduction with a global positioning system (GPS). Car location system 100 receives a GPS signal transmitted from a GPS satellite, and acquires position information, speed information of own vehicle 130 (police car) and map information.

Stereo distance-measuring camera 110 measures distances between own vehicle 130 (police car) and a plurality of running vehicles (for example, first vehicle 120A and second vehicle 120B) running in front of own vehicle 130. Then, based on time changes of the measured distances, stereo distance-measuring camera 110 calculates a relative speed between own vehicle 130 and first vehicle 120A, and a relative speed between own vehicle 130 and second vehicle 120B. Note that relative speeds between own vehicle 130 and rear vehicles can also be calculated similarly by adjusting a disposed position and angle of view of stereo distance-measuring camera 110.

[1-1-2. Recorded Video]

Figure 2:
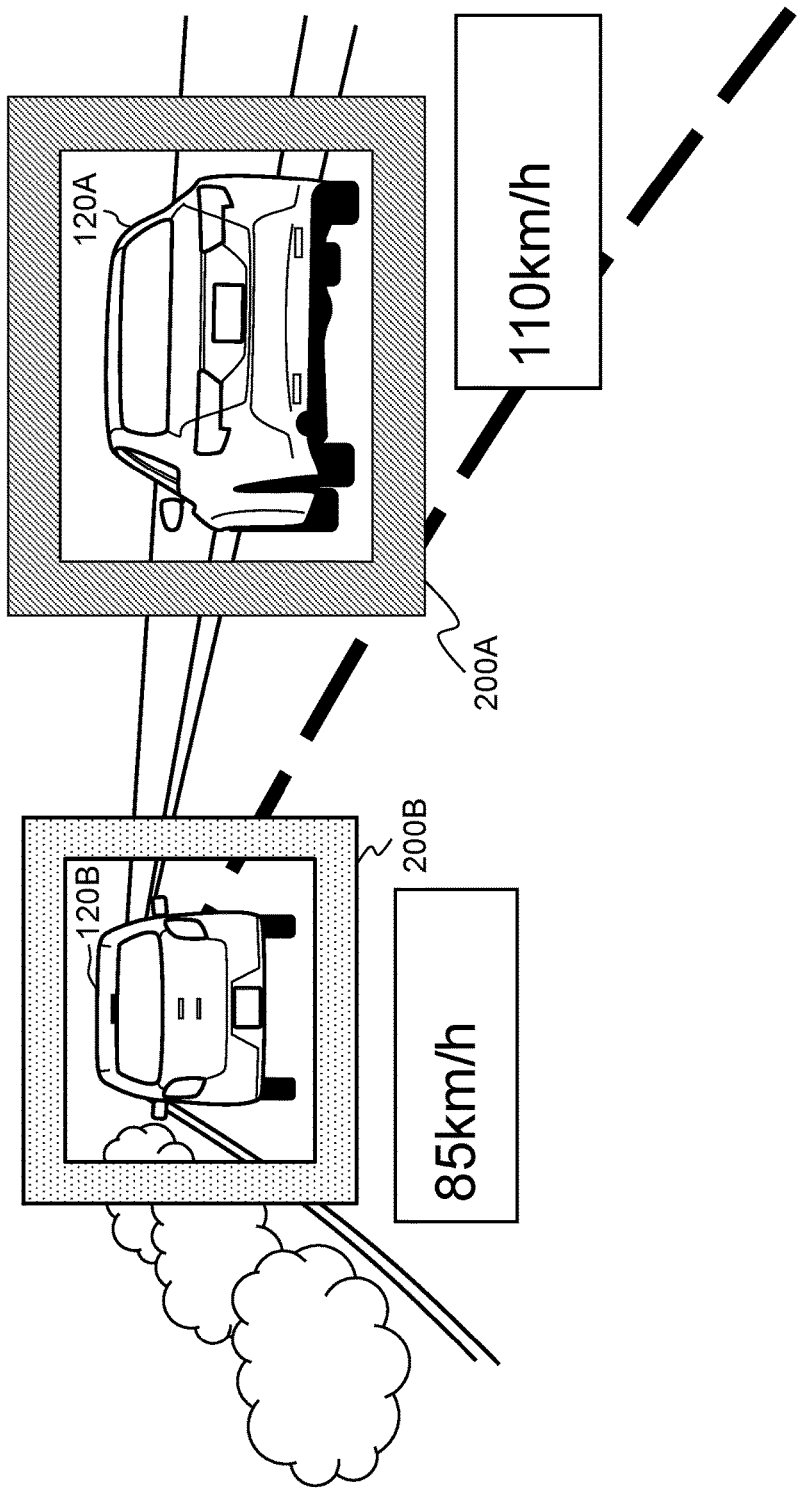
FIG. 2 is a view illustrating an example of a video recorded in the first exemplary embodiment.

FIG. 2 is a view illustrating an example of a video (superimposed video) recorded by the speed limit violation control system. In the recorded video, first vehicle 120A and second vehicle 120B, which are main subjects, are recorded. In addition, on an upper right corner of the recorded video, a speed limit, position information, recording date and time (including minutes and seconds) and the like are superimposed and recorded. Moreover, frames are superimposed on the vehicles (first vehicle 120A and second vehicle 120B) recognized as vehicles by stereo distance-measuring camera 110. For example, when first vehicle 120A is breaking the speed limit, first vehicle 120A is surrounded by red frame 200A. When second vehicle 120B is not breaking the speed limit, second vehicle 120B is surrounded by yellow frame 200B. Moreover, in the recorded video, running speeds of first vehicle 120A and second vehicle 120B are superimposed and recorded near first vehicle 120A and second vehicle 120B, respectively.

[1-1-3. Configuration of Stereo Distance-Measuring Camera]

Figure 3:
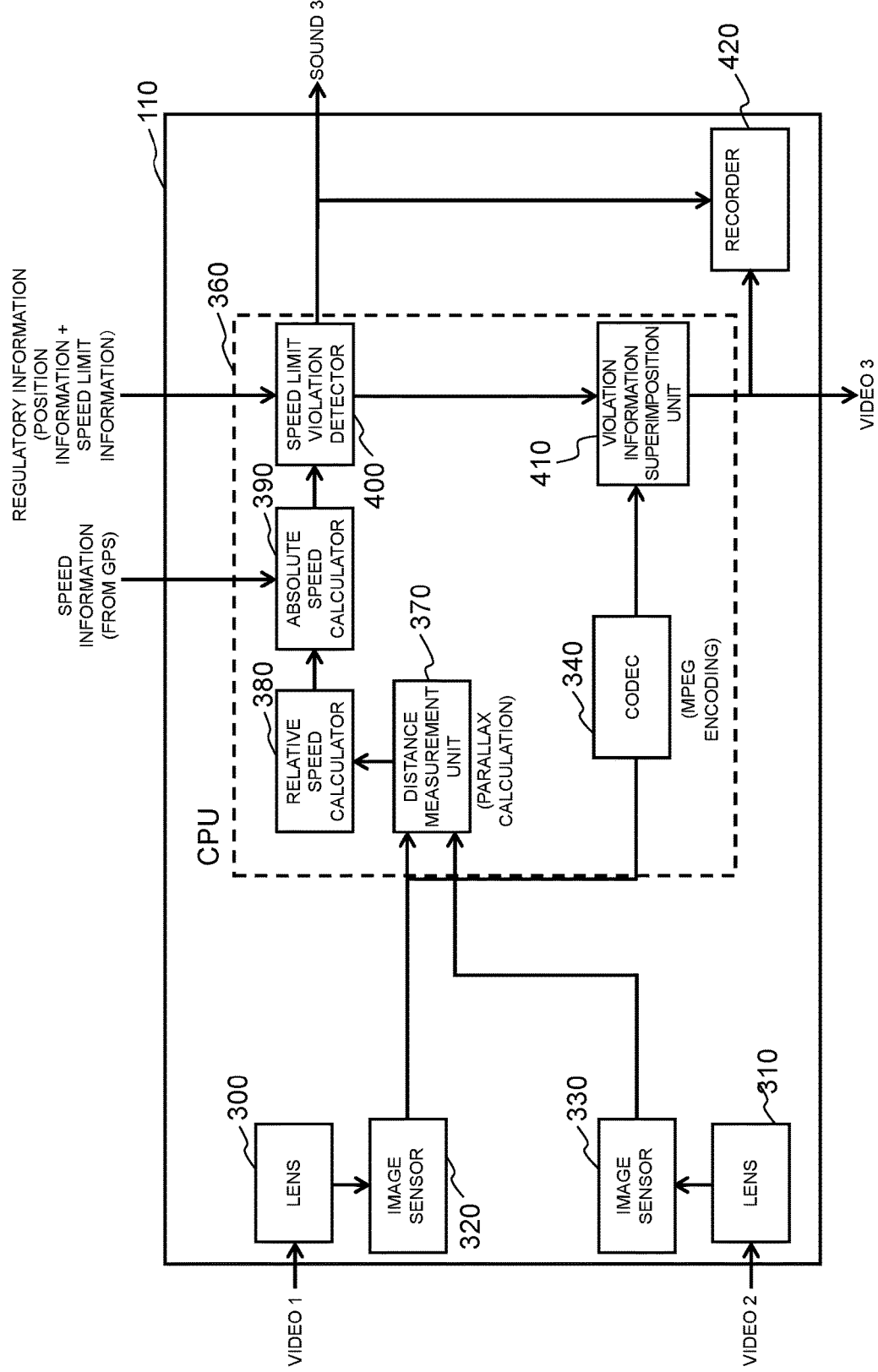
FIG. 3 is a block diagram of a stereo distance-measuring camera in the first exemplary embodiment.

FIG. 3 is a block diagram of stereo distance-measuring camera 110.

Video 1 is input to lens 300, and is converted into an electric signal by image sensor 320. Video 2 is input to lens 310, and is converted into an electric signal by image sensor 330.

Image sensors 320, 330 output video signals of video 1 and video 2 to distance measurement unit 370 of central processing unit (CPU) 360, and distance measurement unit 370 acquires the video signals. Distance measurement unit 370 calculates a parallax between video 1 and video 2, thereby calculating a distance between own vehicle 130 and forward running vehicle 120. Distance measurement unit 370 is implemented by a hardware circuit or a program.

The electric signal of video 1 is input to codec 340, and is encoded into MPEG data.

Relative speed calculator 380 acquires data of the distance calculated by distance measurement unit 370. Based on a change of the distance per time, relative speed calculator 380 calculates the relative speed between own vehicle 130 and the forward running vehicle (for example, at least either one of first vehicle 120A and second vehicle 120B). Relative speed calculator 380 is implemented by a hardware circuit or a program.

Absolute speed calculator 390 acquires the speed information of own vehicle 130, which is sent from car location system 100. Absolute speed calculator 390 calculates an absolute speed of the forward running vehicle based on the acquired speed information of own vehicle 130 and the relative speed calculated by relative speed calculator 380. Absolute speed calculator 390 is implemented by a hardware circuit or a program.

Speed limit violation detector 400 acquires the position information and speed limit information, which are sent from car location system 100. Hereinafter, the position information and the speed limit information are collectively referred to as regulatory information. Speed limit violation detector 400 detects a speed limit violation based on the acquired regulatory information and the absolute speed of the forward running vehicle. Speed limit violation detector 400 is implemented by a hardware circuit or a program.

Based on information on the speed limit violation detected by speed limit violation detector 400, violation information superimposition unit 410 superimposes the frame (for example, frame 200A in FIG. 2) of such a violation vehicle, the running speed information thereof, the speed limit information, the date and the time, the position information, and the like on the video to be recorded. Then, violation information superimposition unit 410 outputs a video signal (video 3). Violation information superimposition unit 410 is implemented by a hardware circuit or a program.

Recorder 420 records video 3 output from violation information superimposition unit 410. Moreover, a sound signal for warning included in video 3 and issued at a time of the violation is generated by speed limit violation detector 400, and is recorded as sound 3 in recorder 420. Moreover, the sound signal is output as sound 3 to car location system 100.

Note that each of image sensor 320 and image sensor 330 is equivalent to an imaging unit of the present disclosure. CPU 360 is equivalent to a controller of the present disclosure. Recorder 420 is equivalent to a recorder of the present disclosure.

[1-1-4. Configuration of Car Location System]

Figure 4:
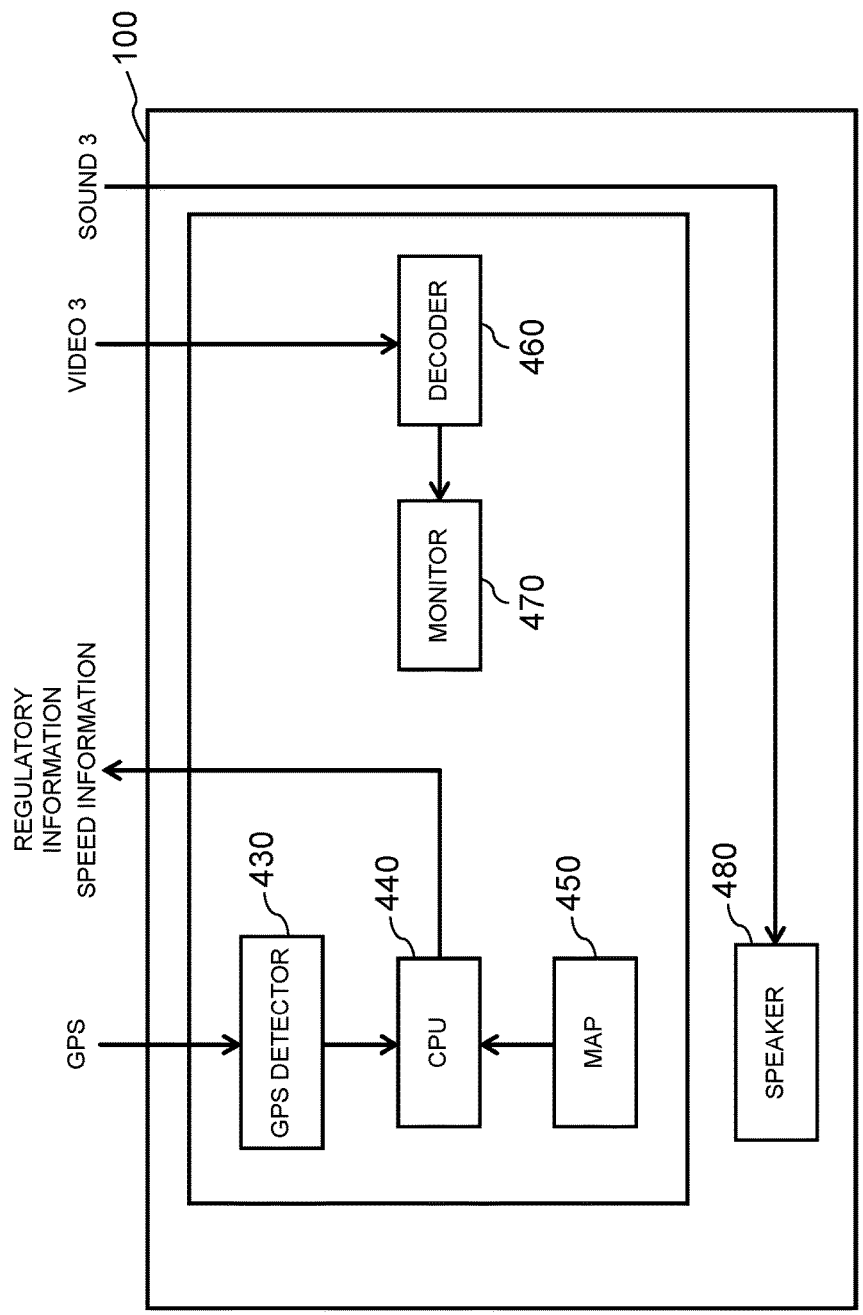
FIG. 4 is a block diagram of a car location system in the first exemplary embodiment.

FIG. 4 is a block diagram of car location system 100. Car location system 100 includes GPS detector 430, MAP 450, CPU 440, decoder 460, monitor 470 and speaker 480.

GPS detector 430 acquires position information and time information from the GPS.

MAP 450 is a recording medium that stores map information. The speed limit information is also included in the map information. The speed limit mentioned herein is a maximum speed designated by a road sign, a road mark, or the like on each road, and is different from a legal speed that is a maximum speed specified by, for example, a government ordinance for each of vehicle categories.

Referring to the position information acquired from GPS detector 430 and the map information of MAP 450, CPU 440 acquires speed limit information corresponding to the acquired position information. Moreover, CPU 440 calculates a speed of own vehicle 130 from the acquired position information and time information. CPU 440 transmits the position information and the speed limit information as the regulatory information to speed limit violation detector 400 of stereo distance-measuring camera 110. Moreover, CPU 440 transmits the speed information of own vehicle 130 to absolute speed calculator 390 of stereo distance-measuring camera 110.

Decoder 460 receives the signal of video 3, which is output from stereo distance-measuring camera 110. Decoder 460 decodes the signal of video 3. Monitor 470 outputs video 3 decoded by decoder 460.

Speaker 480 receives the signal of sound 3, which is output from stereo distance-measuring camera 110, and outputs sound 3.

[1-2. Operations]

Operations of the speed limit violation control system configured as described above will be described below.

[1-2-1. Flow of Operations of Speed Limit Violation Control System]

Figure 5:
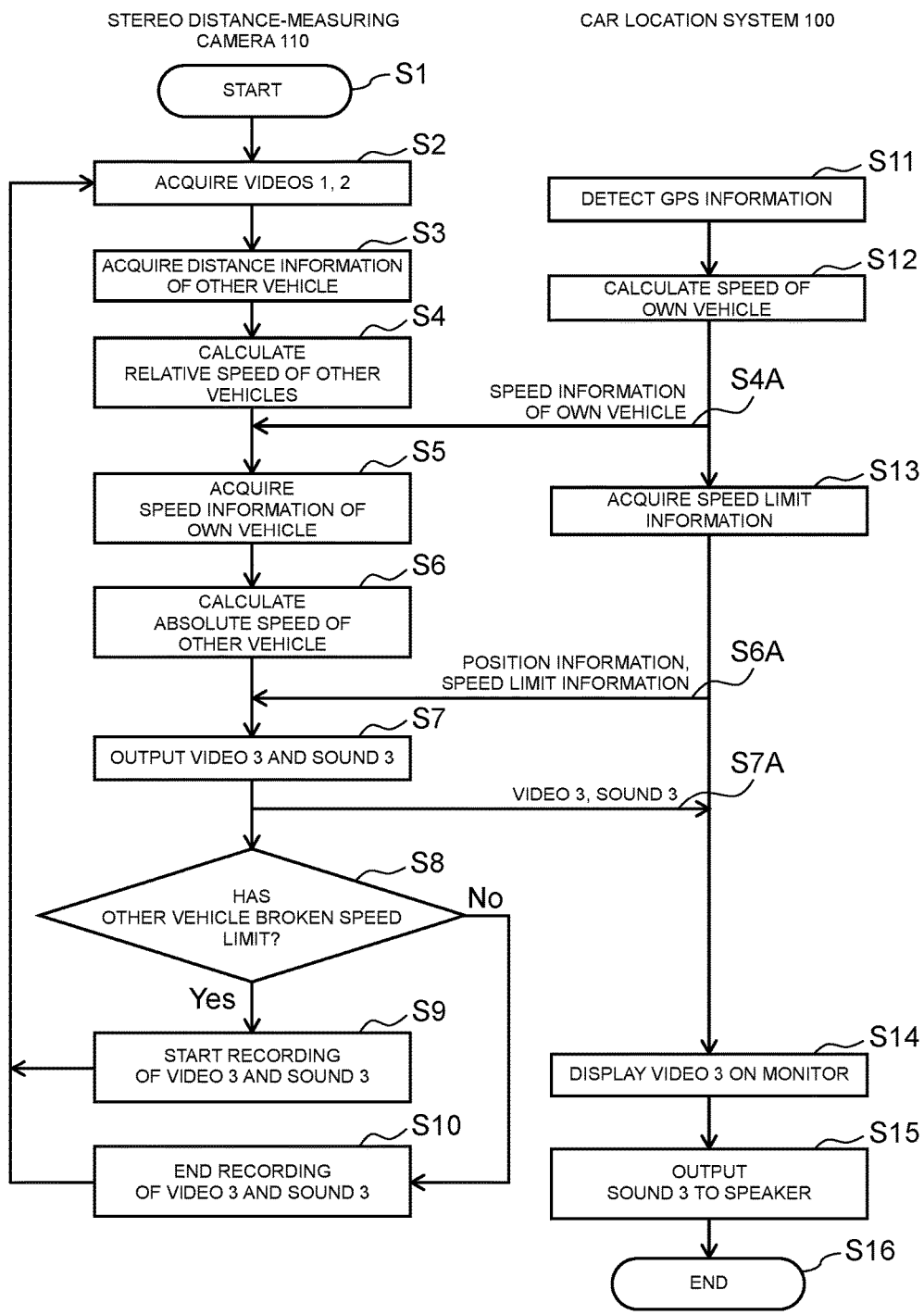
FIG. 5 is a flowchart for describing operations of the speed limit violation control system in the first exemplary embodiment.

FIG. 5 is a flowchart for describing the operations of the speed limit violation control system.

Stereo distance-measuring camera 110 performs an initial operation such as calibration when a power supply is turned on (S1).

Stereo distance-measuring camera 110 acquires videos 1 and 2 from two right and left lenses 300, 310, and converts these videos into the electric signals by image sensors 320, 330. Moreover, stereo distance-measuring camera 110 encodes the electric signals of the videos into the MPEG data by codec 340 (S2).

Distance measurement unit 370 of CPU 360 acquires the data of the right and left videos, and calculates the parallax between the right and left videos. Then, distance measurement unit 370 acquires distance information between own vehicle 130 and the forward running vehicle (for example, at least either one of first vehicle 120A and second vehicle 120B) (S3).

Relative speed calculator 380 of CPU 360 calculates the relative speed of the forward running vehicle (for example, at least either one of first vehicle 120A and second vehicle 120B) with respect to own vehicle 130 based on the time change of the distance information acquired in step S3 (S4).

Absolute speed calculator 390 of CPU 360 acquires the speed information of own vehicle 130, which is calculated in step S12 to be described later (S5).

Moreover, absolute speed calculator 390 of CPU 360 calculates the absolute speed of the forward running vehicle based on the relative speed of the forward running vehicle and the speed of own vehicle 130 (S6).

Speed limit violation detector 400 of CPU 360 acquires the speed limit information acquired by step S13 to be described later and the position information (S6A). Violation information superimposition unit 410 of CPU 360 superimposes the running speed of the forward running vehicle, the speed limit, the position information, the date and time, and the like on the imaged video, and outputs video 3. Moreover, speed limit violation detector 400 creates sound data of an alarm and the like, and outputs sound 3 (S7). Video 3 and sound 3, which are thus output, are transmitted to car location system 100 (S7A).

Speed limit violation detector 400 of CPU 360 determines whether or not the forward running vehicle is breaking the speed limit (S8).

When speed limit violation detector 400 determines in step S8 that the forward running vehicle is not breaking the speed limit (NO in S8), and when the video is not being recorded at that point of time, then CPU 360 skips over step S10, and directly returns to step S2. When a result of the determination in step S8 is NO, and when the video is being recorded at that point of time, then CPU 360 ends the recording of the video, which is under execution (S10), and returns to step S2.

When speed limit violation detector 400 determines in step S8 that the forward running vehicle is breaking the speed limit (YES in S8), CPU 360 causes recorder 420 to start recording video 3 and sound 3, which are output in step S7, (S9), and returns to step S2.

Meanwhile, car location system 100 detects the position information (GPS information) by GPS detector 430 (S11). CPU 440 of car location system 100 calculates the speed of own vehicle 130 based on the position information (S12), and transmits the speed information of own vehicle 130 to stereo distance-measuring camera 110 (S4A).

CPU 440 acquires a speed limit of a road, on which own vehicle 130 is running, based on the position information acquired in step S11 and the map information stored in advance in car location system 100 (S13), and transmits the position information and the speed limit information to stereo distance-measuring camera 110 (S6A).

Decoder 460 decodes video 3 created in step S7, and displays decoded video 3 on monitor 470 of car location system 100 (S14).

Speaker 480 outputs sound 3 created in step S7 (S15).

When a power supply of car location system 100 is turned off, the operations are ended (S16).

[1-2-2. Timing of Video Recording]

Figure 6:
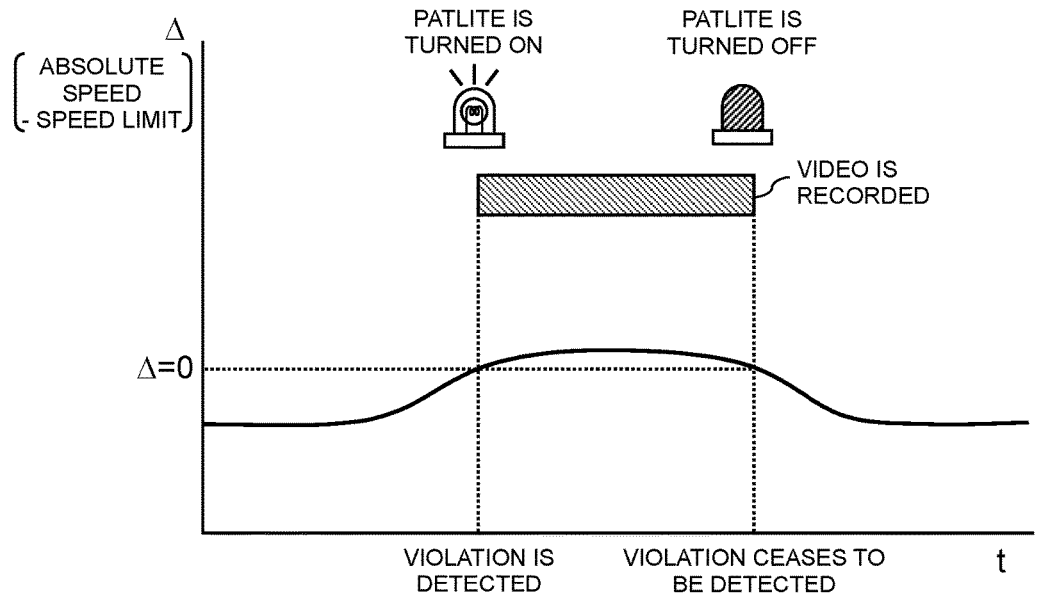
FIG. 6 is a timing chart for describing timing to start/end recording a video in the first exemplary embodiment.

FIG. 6 is a timing chart of video recording in this exemplary embodiment. A vertical axis in FIG. 6 represents a difference $\Delta$ obtained by subtracting the speed limit from the absolute speed of the running vehicle. $\Delta=0$ indicates that the difference between the absolute speed of the running vehicle and the speed limit is zero. Note that the speed limit is equivalent to a reference value of the present disclosure. A horizontal axis in FIG. 6 represents time t.

When the absolute speed of the running vehicle exceeds the speed limit that is the reference value, speed limit violation detector 400 in CPU 360 of stereo distance-measuring camera 110 detects the violation, and CPU 360 causes recorder 420 to start the video recording. When the absolute speed of the running vehicle falls down to the speed limit or less, speed limit violation detector 400 ceases the detection of the violation, and CPU 360 causes recorder 420 to stop the video recording.

Note that, in this exemplary embodiment, CPU 360 controls lighting of a Patlite (registered trademark; hereinafter, the same shall apply) (Patlite 500 in FIG. 1) mounted on the police car. Patlite 500 can be a rotary beacon light. Specifically, CPU 360 causes Patlite 500 to automatically turn on at timing of detecting the speed limit violation. In this way, Patlite 500 can be turned on simultaneously with the detection of the speed limit violation, and such speed limit violation control can be executed efficiently. Moreover, CPU 360 turns off Patlite 500 at timing when the detection of the speed limit violation ceases.

[1-3. Effects and Others]

As described above, in this exemplary embodiment, the speed limit violation control system includes: the imaging unit (image sensor 320, image sensor 330); recorder (recorder 420); and controller (CPU 360). The imaging unit images the running vehicle (at least either one of first vehicle 120A and second vehicle 120B). The recorder records the video imaged by the imaging unit. The controller calculates the speed of the vehicle based on the videos of the imaging unit, and based on the calculated speed, determines the starting point and ending point of the video recorded in the recorder.

In this way, the speed limit violation control system of this exemplary embodiment can automatically specify such a speed limit violation vehicle running at a speed exceeding the speed limit. Moreover, the speed limit violation control system can automatically image the video of the vehicle running at the speed exceeding the speed limit. Then, the speed limit violation control system can record the video based on the timing of detecting the violation, and accordingly, can record the violation accurately. Moreover, the speed limit violation control system can mainly record the video at the time of the violation, and accordingly, can reduce a recording volume. Furthermore, since the speed limit violation control system can mainly record the video at the time of the violation, a user can easily refer to a situation of the violation later.

Moreover, a speed limit violation control method of this exemplary embodiment includes: a step of imaging a running vehicle; a step of calculating a speed of the vehicle based on an imaged video; a step of determining a starting point and ending point of the video as a recording target based on the calculated speed; a step of recording the video from the starting point to the ending point.

In this way, the speed limit violation control method of this exemplary embodiment can automatically specify the speed limit violation vehicle running at a speed exceeding the speed limit. Moreover, the speed limit violation control method can automatically image the video of the vehicle running at the speed exceeding the speed limit. Then, the speed limit violation control method can record the video based on the timing of detecting the violation, and accordingly, can record the violation accurately. Moreover, the speed limit violation control method can mainly record the video at the time of the violation, and accordingly, can reduce the recording volume. Furthermore, since the speed limit violation control method can mainly record the video at the time of the violation, the user can easily refer to the situation of the violation later.

Moreover, in the speed limit violation control system of this exemplary embodiment, the controller (CPU 360) determines the starting point and the ending point of the video recording such that a point from the starting point to the ending point includes a period since the speed of the vehicle (at least either one of first vehicle 120A and second vehicle 120B) exceeds the set reference value (for example, the speed limit) until the speed of the vehicle falls down to the reference value or less.

For example, in this exemplary embodiment, the video recording is started substantially simultaneously with the timing when speed limit violation detector 400 detects the violation, and the video recording is ended at the timing when the detection of the violation ceases. In this way, in this exemplary embodiment, the violation can be recorded accurately. Moreover, only the video substantially at the time of the violation can be recorded, and accordingly, the recording volume can be reduced. Moreover, only the video substantially at the time of the violation can be recorded, and accordingly, the user can easily refer to the situation of the violation later.

Furthermore, the speed limit violation control system of this exemplary embodiment includes the GPS unit (GPS detector 430 of FIG. 4) that detects the position information. The GPS unit is included in car location system 100. The recorder (recorder 420) records the position information detected by GPS detector 430, the time when the video is imaged, and the video (video 3) in association with one another. Moreover, the recorder records the position information, the speed limit information, the information on the absolute speed of the running vehicle, and the sound (sound 3) in association with one another.

From the GPS information acquired by the GPS unit, the controller (CPU 360) can acquire the speed and position information of own vehicle 130. Moreover, using the GPS information, the controller can acquire the speed limit information on the road on which the vehicle is running and the like with reference to the map information stored in MAP 450. Furthermore, based on the acquired information, the controller can calculate the absolute speed of the running vehicle, and can detect the speed limit violation.

Moreover, the speed limit violation control system of this exemplary embodiment includes: the imaging unit that images the video of the running first and second vehicles taken as the subjects; the input unit (for example, violation information superimposition unit 410) that receives a first speed of the first vehicle and a second speed of the second vehicle; and the recorder (recorder 420) that records the superimposed video obtained by superimposing the first speed and the second speed on the video.

That is, the speed limit violation control system of this exemplary embodiment can record such a video as shown in FIG. 2. The video as shown in FIG. 2 is a superimposed image obtained by superimposing the speed (110 km/h) of first vehicle 120A and the speed (85 km/h) of second vehicle 120B on the video obtained by imaging first vehicle 120A and second vehicle 120B. Such a superimposed video as described above is displayed on monitor 470, whereby the user can efficiently check whether or not a plurality of the vehicles are breaking the speed limit. It is noted that 1 km/h is converted to 0.6213712 mile/h.

(Second Exemplary Embodiment)

A second exemplary embodiment will be described below with reference to FIGS. 5 and 7.

[2-1. Configuration]

A configuration of the second exemplary embodiment is similar to that of the first exemplary embodiment, and accordingly, a description thereof will be omitted.

[2-2. Operations]

[2-2-1. Flow of Operations of Speed Limit Violation Control System]

In a flow of operations of the speed limit violation control system, in step S8 of FIG. 5, the reference value is set to a value lower (slower) than the speed limit by a certain amount, timing of starting the recording is set to timing earlier than timing of detecting the violation, and timing of stopping the recording is set to timing later than timing of ceasing the violation detection.

[2-2-2. Timing of Video Recording]

Figure 7:
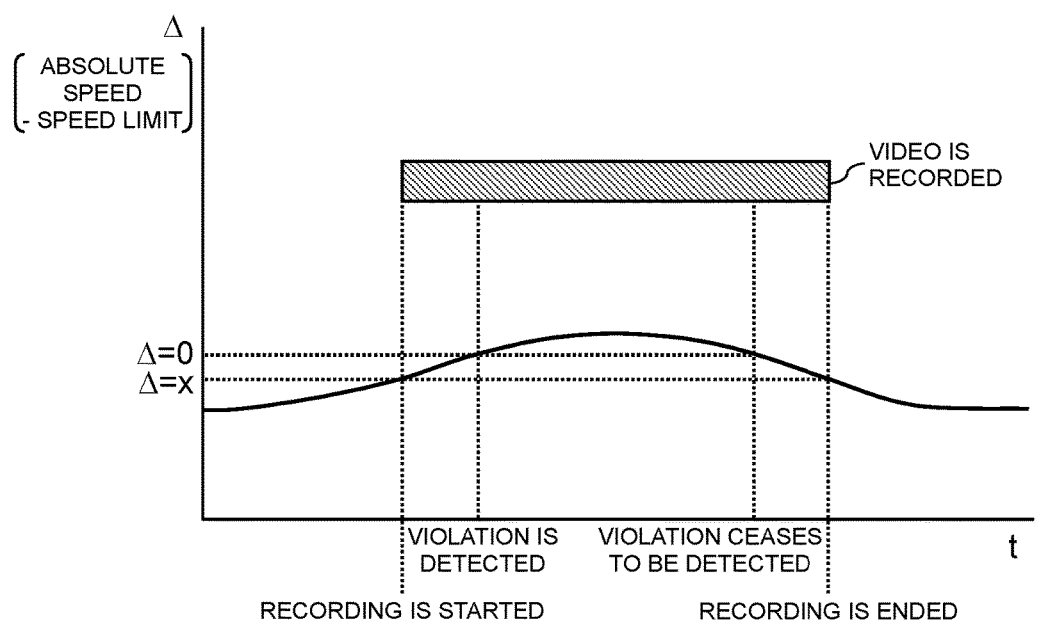
FIG. 7 is a timing chart for describing timing to start/end recording a video in a second exemplary embodiment.

FIG. 7 is a timing chart of video recording in this exemplary embodiment.

The recording of the video is started before the violation is detected in speed limit violation detector 400 in CPU 360 of stereo distance-measuring camera 110 (that is, before the speed difference $\Delta$ described above exceeds zero ($\Delta$=0)). Specifically, the recording of the video is started at timing when the speed difference $\Delta$ exceeds x ($\Delta$=x (x<0)). For example, if x is set equal to −5 km/h (x=−5 km/h), then the recording of the video is started at timing when the value obtained by subtracting the speed limit from the absolute speed of the running vehicle exceeds −5 km/h.

Moreover, when the detection of the violation ceases in speed limit violation detector 400 in CPU 360 of stereo distance-measuring camera 110, the recording of the video is stopped after a while. Specifically, the recording of the video is ended at timing when the speed difference $\Delta$ falls down to x (x<0) or less ($\Delta$=x (x<0) or less). For example, if x is set equal to −5 km/h (x=−5 km/h), then the recording of the video is ended at timing when the value obtained by subtracting the speed limit from the absolute speed of the running vehicle falls down to −5 km/h or less.

[2-3. Effects and Others]

In this exemplary embodiment, the user can arbitrarily change threshold x corresponding to the reference value for determining the start of the video recording.

In this way, the starting point of the video recording becomes adjustable. Therefore, the speed limit violation control system becomes capable of recording the video from a little while before the running vehicle runs beyond the speed limit, and makes it easy to grasp a situation at the time of the violation.

Moreover, in this exemplary embodiment, the user can arbitrarily change threshold x corresponding to the reference value for determining the end of the video recording.

In this way, the ending point of the video recording becomes adjustable. Therefore, the speed limit violation control system becomes capable of recording the video until a little while after the speed of the running vehicle falls down to the speed limit or less, and makes it easy to grasp the situation at the time of the violation.

(Third Exemplary Embodiment)

A third exemplary embodiment will be described below with reference to FIGS. 1, 5 and 8. In the first exemplary embodiment, an example of controlling the speed limit violation of at least one running vehicle is mentioned. In the third exemplary embodiment, a description will be given of a speed limit violation control system capable of controlling the speed limit violation of each of a plurality of vehicles (for example, both of first vehicle 120A and second vehicle 120B in FIG. 1) particularly when the plurality of vehicles are breaking the speed limit.

[3-1. Configuration]

A configuration of the third exemplary embodiment is similar to that of the first exemplary embodiment, and accordingly, a description thereof will be omitted.

[3-2. Operations]

[3-2-1. Flow of Operations of Speed Limit Violation Control System]

FIG. 5 shows a flow of the operations of the speed limit violation control system. In this exemplary embodiment, in step S3 of the flow, CPU 360 acquires distance information between own vehicle 130 and each of the plurality of running vehicles (for example, first vehicle 120A and second vehicle 120B).

Moreover, in step S4, CPU 360 acquires a relative speed of each of the plurality of running vehicles with respect to own vehicle 130.

Moreover, in step S6, CPU 360 calculates an absolute speed of each of the plurality of running vehicles.

Moreover, in step S8, CPU 360 determines whether or not each of the plurality of running vehicles is breaking the speed limit.

[3-2-2. Timing of Video Recording]

Figure 8:
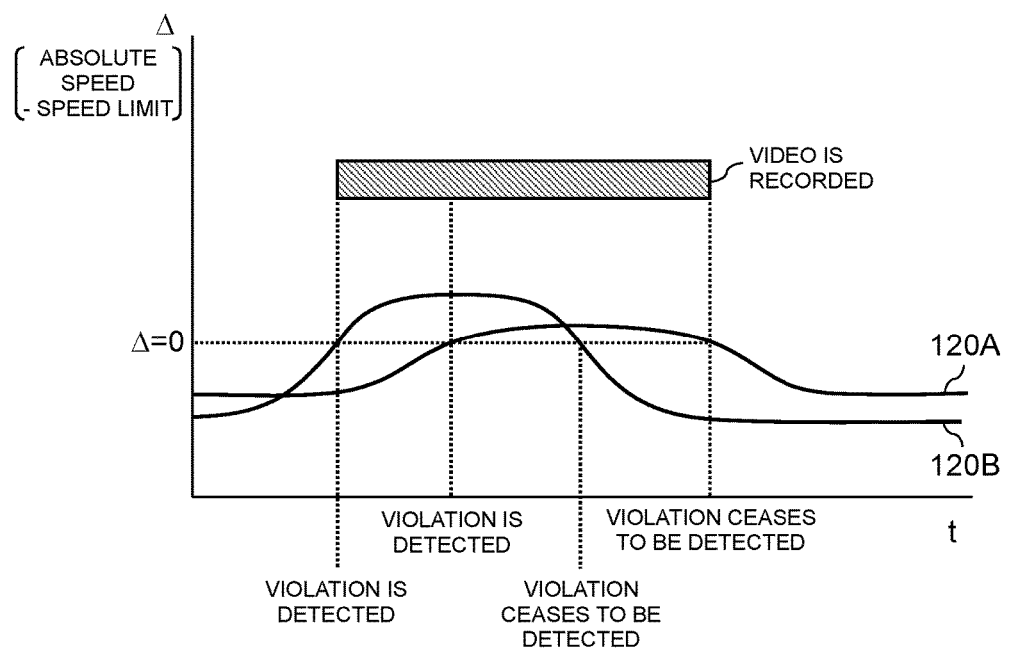
FIG. 8 is a timing chart for describing timing to start/end recording a video in a third exemplary embodiment.

FIG. 8 is a timing chart of video recording in this exemplary embodiment.

When the violation of second vehicle 120B is detected (that is, when such a speed difference Δ as described above exceeds zero (Δ=0)) in speed limit violation detector 400 in CPU 360 of stereo distance-measuring camera 110, then recorder 420 starts to record the video. When speed limit violation detector 400 subsequently detects the violation of first vehicle 120A, recorder 420 continues to record the video.

Thereafter, when speed limit violation detector 400 continuously detects the violation of first vehicle 120A even if ceasing to detect the violation of second vehicle 120B (that is, even if the speed difference Δ falls down to zero or less (Δ=0 or less)), recorder 420 continues to record the video.

Next, when speed limit violation detector 400 ceases to detect the violation of first vehicle 120A (that is, when the speed difference Δ falls down to zero or less (Δ=0 or less)), recorder 420 ends the recording of the video.

[3-3. Effects and Others]

As described above, the vehicle controlled by the speed limit violation control system of this exemplary embodiment includes the plurality of vehicles (for example, at least the first vehicle and the second vehicle). The controller (CPU 360) determines the starting point and ending point of the video recording based on the speeds of the first vehicle and the second vehicle.

For example, in this exemplary embodiment, the recording of the video is started when either one of first vehicle 120A and second vehicle 120B break the speed limit. Moreover, the recording of the video is ended when both of first vehicle 120A and second vehicle 120B cease to break the speed limit.

In this way, the videos of the speed limit violations of the plurality of vehicles can be recorded as a single video file. Hence, evidence videos can be recorded efficiently even if the plurality of vehicles are breaking the speed limit in the same period.

Note that, when a number of the vehicles of which speed limit violations are to be controlled is three or more, the recording of the video may be started when any one of these vehicles breaks the speed limit. Moreover, the recording of the video may be ended when all of these vehicles cease to break the speed limit.

(Fourth Exemplary Embodiment)

A fourth exemplary embodiment will be described below with reference to FIGS. 5 to 8.

[4-1. Configuration]

A configuration of the fourth exemplary embodiment is similar to that of the first exemplary embodiment.

[4-2. Operations]

[4-2-1. Flow of Operations of Speed Limit Violation Control System]

In a flow of operations of a speed limit violation control system of this exemplary embodiment, the recording of video 3 and sound 3 is started in step 9 of FIG. 5 in each of the first, second, and third exemplary embodiments. At the same time, violation information (date and time, position information, speed limit, running speed, and the like) at timing of starting the recording is recorded in a comma-separated values (CSV) file or the like.

Moreover, in the flow of the operations of the speed limit violation control system of this exemplary embodiment, the recording of video 3 and sound 3 is ended in step S10 of FIG. 5 in each of the first, second, and third exemplary embodiments. At the same time, violation information at timing of ending the recording is recorded in the CSV file or the like.

Note that the recording of the violation information in the CSV file or the like may be continuously implemented during such a period from when the recording of video 3 and sound 3 is started until when the recording is ended. However, only at the timing of starting the recording of video 3 and sound 3 and at the timing of ending the recording thereof, the violation information is recorded in the CSV file or the like, whereby an amount of data is reduced. Hence, efficiency is enhanced when the data for determining the violation is extracted.

[4-2-2. Timing of Violation Information Recording]

The timing of recording the violation information is similar to the video recording timing shown in each of FIG. 6 (video recording timing chart of the first exemplary embodiment), FIG. 7 (video recording timing chart of the second exemplary embodiment) and FIG. 8 (video recording timing chart of the third exemplary embodiment).

[4-3. Effects and Others]

As described above, in this exemplary embodiment, the violation information is recorded in another file than that for the video recording.

In this way, the speed limit violation control can be saved into a database. Therefore, the violation information can be linked with an enormous amount of image data, and it is also easy to manage the image data.

(Other Exemplary Embodiments)

The first to fourth exemplary embodiments have been described above as illustrations of the technique disclosed in the present application. However, the technique in the present disclosure is not limited thereto, and can also be applied to exemplary embodiments subjected to alteration, substitution, addition, omission and the like. In addition, a new exemplary embodiment can be made by combining the respective constituents described in the above first to fourth exemplary embodiments.

Therefore, other exemplary embodiments will be described below.

In each of the first to fourth exemplary embodiments, the GPS has been described as an example of a unit for acquiring the speed of the own vehicle. The unit for acquiring the speed of the own vehicle just needs to be a unit for acquiring a movement distance thereof per unit time. Hence, the unit for acquiring the speed of the own vehicle is not limited to the GPS. However, if the GPS is used as the unit for acquiring the speed of the own vehicle, then a high-precision speed value is obtained. Moreover, the speed information of the own vehicle may be acquired from an engine control unit (ECU). If the acquisition of the speed information from the ECU is used, then the speed of the own vehicle can be acquired even at a place such as a tunnel where the GPS satellite cannot be found.

In each of the first to fourth exemplary embodiments, an example of mounting the speed limit violation control system on the police car is mentioned. However, the speed limit violation control system may be mounted on a vehicle other than the police car, and further, may be mounted on a device other than the vehicle. For example, the speed limit violation control system may be mounted on an automatic speed limit violation control device such as ORBIS (registered trademark). In this case, the speed limit violation control system does not need to calculate the absolute speed of the own vehicle (for example, police car). Moreover, in this case, a light quantity of an electronic flash is increased in case of low illuminance at night for example more than in case of relatively high illuminance in daytime for example.

Moreover, in each of the first to fourth exemplary embodiments, the description has been given of the example in which the starting point and ending point of the video recording are automatically determined by the controller. However, depending on the situation, the user may determine at least either one of the starting point and ending point of the video recording. In this way, when the video recording is executed due to a malfunction, the user can manually stop the video recording. Moreover, when the video recording is not executed due to a malfunction, the user can manually start the video recording. Furthermore, when the user wishes to discontinue or temporarily stop the speed limit violation control due to a variety of circumstances, the user can stop the video recording. Moreover, when the user wishes to record a video due to a violation other than the speed limit violation, the user can start the video recording arbitrarily.

In each of the first to fourth exemplary embodiments, the CPU has been described as an example of the controller. The controller may be configured in any way physically as long as the controller can perform the distance measurement (parallax calculation) and the speed calculation based on the video of the stereo distance-measuring camera. Hence, the controller is not limited to the CPU. However, if a programmable CPU is used, then processing contents can be changed by changing a program. Accordingly, a degree of freedom in designing the controller can be enhanced. Moreover, the controller may also be achieved by hard logic. For improvement of processing speed, it is effective to achieve the controller by hard logic. A single semiconductor chip or a plurality of semiconductor chips may be used to physically configure the controller. When the controller is configured with the plurality of semiconductor chips, the respective controls described in the scope of claims may be implemented by different semiconductor chips. In this case, it can be considered that such a single controller is configured with the plurality of semiconductor chips. Moreover, the controller may be configured with the semiconductor chip and members (for example, capacitors) having functions different from those of the semiconductor chip. Moreover, the single semiconductor chip may be configured so as to achieve the function of the controller and the other functions.

Moreover, the above-mentioned exemplary embodiments illustrate the technique in the present disclosure, and accordingly, can be subjected to various types of alterations, substitutions, additions, omissions, and the like within the scope of claims or equivalents of the claims.

The present disclosure is applicable to a device that automatically records the video of the speed limit violation in response to the road on which the vehicle runs, and performs the speed limit violation control. Specifically, the present disclosure is applicable to a speed limit violation control system of a police vehicle, and the like.

What is claimed is:

1. A speed limit violation control system comprising:
   an imaging unit that images a running vehicle to provide a video;
   a recorder that records a portion of the video, the portion of the video being defined by a starting point for recording and an ending point for recording; and
   a controller that
   calculates a speed of the vehicle based on the video provided by the imaging unit, and
   determines the starting point for recording and the ending point for recording of the portion of the video recorded by the recorder, based on the calculated speed,
   wherein the controller determines the starting point and the ending point such that a period from the starting point to the ending point includes a period from when the speed of the vehicle exceeds a set reference value until when the speed of the vehicle falls down to the reference value or less.

2. The speed limit violation control system according to claim 1, wherein
   the vehicle includes a first vehicle and a second vehicle, and
   the controller determines the starting point and the ending point based on the speeds of the first vehicle and the second vehicle.

3. The speed limit violation control system according to claim 1, wherein the controller sets the starting point so as to be before a time when the speed of the vehicle exceeds the reference value.

4. The speed limit violation control system according to claim 1, wherein the controller sets the ending point so as to be after a time when the speed of the vehicle falls down to the reference value or less.

5. The speed limit violation control system according to claim 1, further comprising a global positioning system (GPS) unit that detects position information,
   wherein the recorder records the position information, and a time when the video is imaged in association with the portion of the video.

6. The speed limit violation control system according to claim 1, wherein the recorder records time information in a file different from a file for the portion of the video, the time information relating to timing when the speed of the vehicle exceeds the reference value and timing when the speed of the vehicle falls down to the reference value or less.

7. A speed limit violation control system comprising:
an imaging unit that images a video of a first vehicle and a second vehicle, which are running and are taken as subjects;
an input unit that receives a first speed of the first vehicle, a second speed of the second vehicle, position information including geospatial data acquired by an own vehicle and speed limit information corresponding to the position information; and
a recorder that records a superimposed video obtained by superimposing the first speed, the second speed, the position information including geospatial data and the speed limit information on the video.

* * * * *